United States Patent [19]

Diethelm

[11] Patent Number: 5,418,079
[45] Date of Patent: May 23, 1995

[54] AXIALLY SYMMETRIC FUEL CELL BATTERY

[75] Inventor: Roland Diethelm, Bauma, Switzerland

[73] Assignee: Sulzer Innotec AG, Winterthur, Switzerland

[21] Appl. No.: 263,106

[22] Filed: Jun. 21, 1994

[30] Foreign Application Priority Data

Jul. 20, 1993 [EP] European Pat. Off. ............ 93810517

[51] Int. Cl.⁶ .................................... H01M 8/04
[52] U.S. Cl. ........................... 429/26; 429/30; 429/34
[58] Field of Search .............. 429/26, 30, 34, 12, 429/27

[56] References Cited

U.S. PATENT DOCUMENTS

| | | | |
|---|---|---|---|
| 5,116,696 | 5/1992 | Barp | 429/26 |
| 5,264,300 | 11/1993 | Barp et al. | 429/30 |

FOREIGN PATENT DOCUMENTS

| | | |
|---|---|---|
| 0398111 | 11/1990 | European Pat. Off. |
| 0414270 | 2/1991 | European Pat. Off. |
| 0437175 | 7/1991 | European Pat. Off. |
| 0490808 | 6/1992 | European Pat. Off. |
| 0551054 | 7/1993 | European Pat. Off. |
| 4062757 | 2/1992 | Japan |
| WO91/11829 | 8/1991 | WIPO |

*Primary Examiner*—Anthony Skapars
*Attorney, Agent, or Firm*—Townsend and Townsend Khourie and Crew

[57] ABSTRACT

The fuel cell battery (10), comprising stacked modules (1) and using air and gaseous fuel as reactants, is arranged substantially axially symmetrically. A module comprises the following components: a three-layer, electrochemically active plate (2) which is free from holes and is composed of a solid electrolyte (20) conducting oxide ions as well as a gas and an air electrode (21 and 22); and a plate-shaped, metallic heat exchange element (5) for heating the reactants. According to the invention a porous layer (3) provides connection between the gas electrode (21) and the heat exchange element (5), the porous layer being electrically conductive and acting to equalize thermal stresses; this layer (3) forming further together with the electrochemically active plate (2) an integrated unit.

9 Claims, 2 Drawing Sheets

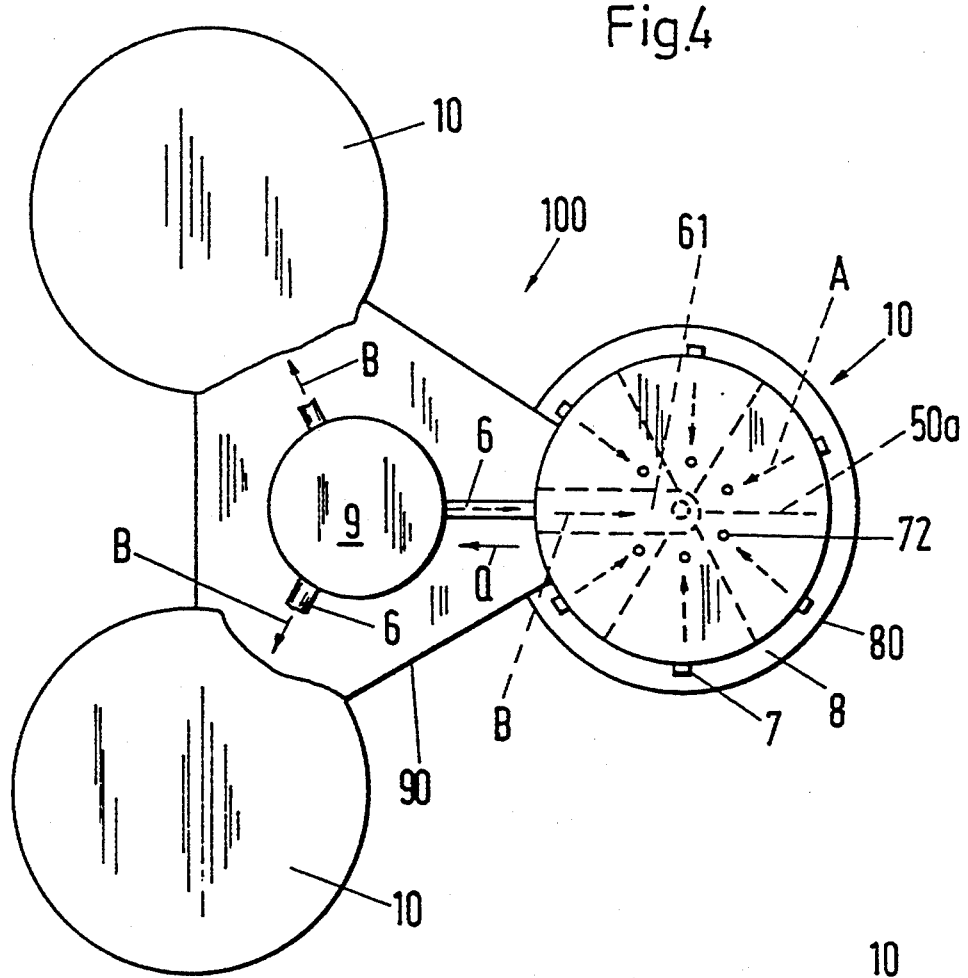
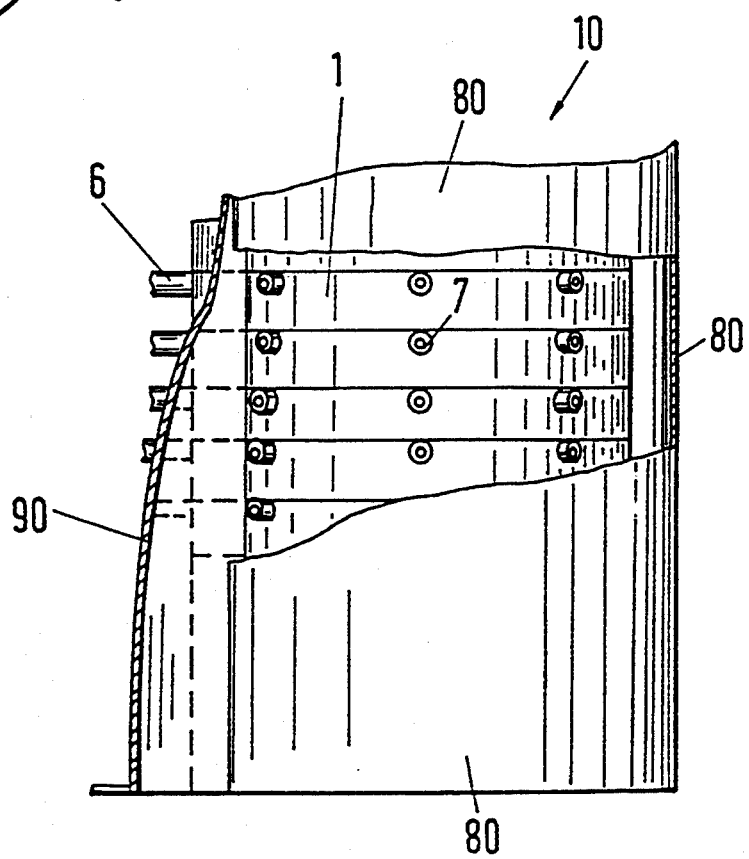

AXIALLY SYMMETRIC FUEL CELL BATTERY

The invention relates to a fuel cell battery comprising stacked arrangement of fuel cell modules. One such device is known from EP-A 0 551 054 (=P.6470). The invention also relates to an arrangement in which at least two fuel cell batteries according to the invention are integrated in one housing.

In the known fuel cell the electrochemically active plate—the so-called PEN—is a self-supporting element which, due to high breakability, may have only a limited diameter. It is not economical to use a diameter greater than about 20 cm. The aim of the invention is to further develop the known fuel cell battery in such a way that the diameter of the PEN structure may be economically carried out to be at least 30 cm. This aim is achieved according to the invention by the characterizing features of claim 1. The dependent claims relate to specific embodiments of the fuel cell battery according to the invention.

The PEN structure is preferably made by a vacuum plasma spray process, VPS process for short. This process is substantially described in the international application WO 91/11829. Novelty of the present invention resides, however, in that, instead of a stiff bearing structure which is porous, a flexible bearing layer, e.g. from a metal felt, is used. Due to the flexibility of the bearing layer varying thermal expansions of the PEN and the heat exchange element cause only small thermal stresses, which do not result in braking of the PEN or formation of fissures. During the VPS spraying of the material for the gas electrode onto the bearing layer their porosity may cause a problem. In order to avoid this problem the surface pores of the bearing layer are filled with a suspension of metallic particles (e.g. nickel, particle size smaller than one micrometre, mixed with terpineol).

The invention will now be explained in greater detail with reference to the drawings, in which:

FIG. 4 is a plan view of an arrangement comprising three fuel cell batteries according to the invention, and FIG. 5 is a partial side view of the arrangement in FIG. 4.

Figures 1, 2, 3:
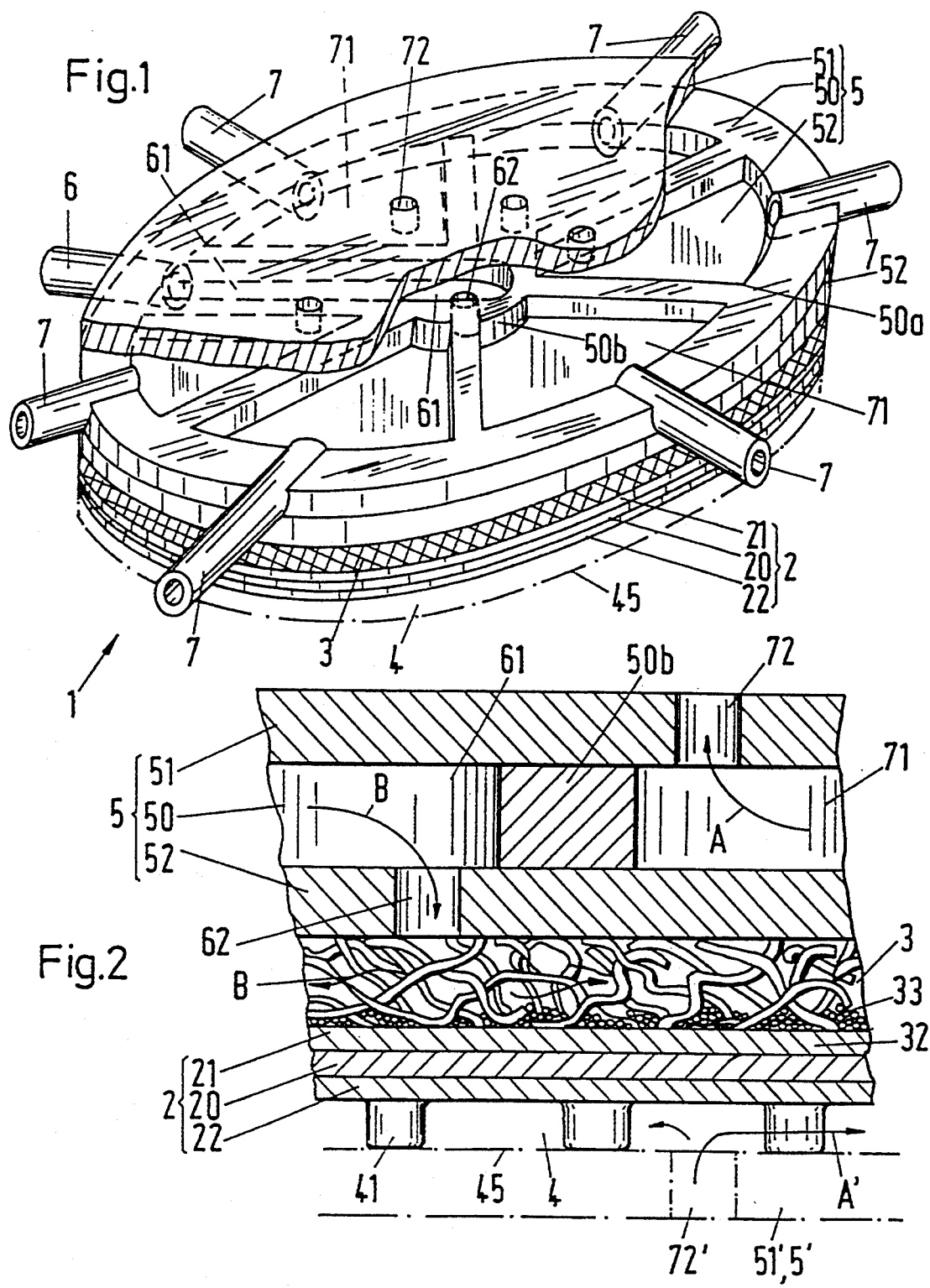
FIG. 1 is a module of a fuel cell battery according to the invention.
FIG. 2 is a section through the module in FIG. 1 along the axis of the battery.
FIG. 3 is a variant embodiment of the bearing layer of the PEN.

Module 1 shown in FIG. 1 has the following components: the electrochemically active plate 2 (PEN) comprising the solid electrolyte 20, the gas electrode 21 and the air electrode 22; the porous and flexible bearing layer 3; the air space 4 with current collectors 41 (see FIG. 2); the plate-shaped heat exchange element 5, composed of a chamber-forming central piece 50 (chambers 61 and 71, partitions 50a and 50b) and two side pieces 51 and 52 with a centrally arranged gas outlet opening 62 and air outlet openings 72; a gas supply conduit 6 and a plurality of air supply conduits 7. A dash-and-dot line is used to show the interface 45 at which the illustrated module 1 is in contact with the adjacent module (not shown). In the chambers 61 and 71 the gas and the—already preheated—air are heated practically to the reaction temperature. The chamber 61 for the gas is gastightly sealed with respect to the chambers 71 for the air. The heat exchange element 5 is made of a high-temperature alloy (for instance "Haynes 230 Alloy", alloy containing 57% Ni, 22% Cr, 14% W).

The section of FIG. 2 shows on a larger scale and partially the components of the module of FIG. 1. The bearing layer 3—here a metal felt—is at the interface 32 firmly connected to the gas electrode 21. The pores of the layer 3 in the region of the interface may be impregnated with particles of metallic powder. The direction of flow of the air and gas are respectively shown by arrows A and B. By a dash-and-dot line is shown the air-side wall 51' of the heat exchange element 5' of the adjacent module. The arrow A' indicates the flow of the air heated in this heat exchanger 5' (air outlet opening 72').

The current collectors 41 on the air electrode 22, which are, by way of example, pin-shaped, preferably only touch the heat exchanger wall 51'. This enables sliding movement in case of differing expansion of the metallic heat exchanger 5' and the PEN. An alloy is known (95% chromium, the remainder iron and yttrium oxide; company Plansee) the thermal expansion of which is the same as that of the PEN. If the heat exchanger 5 or 5' is made of this alloy, the current collector 41 may be firmly connected to the side wall 51' without any damaging thermal stresses being produced.

FIG. 3 shows a variant embodiment of the bearing layer 3: the layer 3 is formed by a coarse-meshed, undulated wire cloth 30 and a fine-meshed, planar wire cloth 31. On the fine-meshed wire cloth is applied the gas electrode. Like the surface of the metal felt 3, FIG. 2, the fine-meshed wire cloth may be impregnated with a metallic powder. The connections between the two wire cloths 30 and 31 and between the wire cloth 30 and the heat exchanger wall 52 may be made, for instance, by spot welding.

The arrangement 100 shown in FIG. 4 comprises three fuel cell batteries 10 according to the invention, which are situated in a common housing having cylindrical walls 80 and straight walls 90. FIG. 5 shows a partial side view. In the middle of the arrangement 100 is a reforming device 9 (cf. hereto EP-A 0 551 054). The arrow Q indicates that radiant heat, which is obtained as waste heat in the fuel cells 1, is guided to the device 9 where it is used for the endothermic conversion process (methane and steam to hydrogen and carbon monoxide). In the region 8 between the stack of fuel cells 1 and the outer wall 80 are provided installations (not shown), by means of which the heat loss to the environment is kept low and freshly supplied air is preheated (cf. thereto EP application No. 92810572.5). When each of the three cell stacks contains 100 modules and the PENs have a diameter of 30 cm, the arrangement 100 is expected to have an output of 50 kW.

I claim:

1. Fuel cell battery (10) comprising modules (1) in stacked arrangement and using air and gaseous fuel as reactants, wherein every module is substantially axially symmetrical and comprises, a three-layer electrochemically active plate (2) with no openings which comprises an oxide ion conducting solid electrolyte (20) and a gas and an air electrode (21 and 22), and a plate-shaped, metallic heat exchange element (5) for heating the reactants, characterised in that a connection between the gas electrode (21) and the heat exchange element (5) is made by a porous layer (3) which is electrically conductive and acts to equalize thermal stresses, and the porous layer (3) and the electrochemically active plate (2) form an integrated unit.

2. Fuel cell battery according to claim 1, characterised in that the porous layer (3) is a metal felt.

3. Fuel cell battery according to claim 2, characterised in that the surface pores of the porous layer (3) on the side of the gas electrode (21) are filled with a supsension of metallic particles (33).

4. Fuel cell battery according to claim 1, characterised in that the porous layer (3) comprises a coarse-meshed, undulated wire cloth (30) and a fine-meshed, planar wire cloth (31), the fine-meshed wire cloth being arranged on the side of the gas electrode (21).

5. Fuel cell battery according to claim 4, characterised in that the fine-meshed wire cloth (31) is impregnated with a suspension of metallic particles.

6. Fuel cell battery according to claim 1 characterised in that the three layers (21, 20, 22) of the electrochemically active plate (2) are produced by a vacuum plasma spray process.

7. Fuel cell battery according to claim 1 characterised in that current collectors (41) are firmly connected to the surface of the air electrode (22).

8. Arrangement (100) including at least two fuel cell batteries (10) according to claim 1 comprising a common housing (80, 90) and a common reforming device (9).

9. Arrangement according to claim 8 including 100 modules (1) per fuel cell battery (10) and the electrochemically active plate (2) has a diameter of about 30 cm to produce electric output of about 50 kW.

* * * * *